United States Patent [19]

Funatsu et al.

[11] 4,221,606
[45] Sep. 9, 1980

[54] PHTHALOCYANINE PIGMENT COMPOSITIONS

[75] Inventors: Takenori Funatsu; Yoichi Inuzuka; Tetsuo Mishina; Kenji Kitamura; Ataru Chiba, all of Tokyo, Japan

[73] Assignee: Toyo Ink Manufacturing Co., Ltd., Tokyo, Japan

[21] Appl. No.: 954,502

[22] Filed: Oct. 25, 1978

[30] Foreign Application Priority Data

Oct. 28, 1977 [JP] Japan .............................. 52/128728

[51] Int. Cl.² .............................................. C08K 5/00
[52] U.S. Cl. .................................. 106/288 Q; 106/23; 106/292; 106/306; 106/308 S; 106/308 N; 106/308 Q; 106/193 R; 106/195; 260/314.5; 260/40 R
[58] Field of Search ........... 106/308 S, 308 N, 288 Q; 260/314.5

[56] References Cited

U.S. PATENT DOCUMENTS

| | | | |
|---|---|---|---|
| 2,761,868 | 9/1956 | Lacey | 260/314.5 |
| 3,732,118 | 5/1973 | Langley et al. | 106/308 N |
| 3,920,469 | 11/1975 | Kienzle et al. | 106/288 Q |
| 3,954,392 | 5/1976 | Dien | 260/314.5 |
| 3,973,981 | 8/1976 | Miyatake et al. | 106/288 Q |
| 3,981,734 | 9/1976 | Cabut et al. | 260/314.5 X |
| 3,985,570 | 10/1976 | Cabut et al. | 260/314.5 X |
| 4,039,346 | 8/1977 | Kranz | 106/288 Q |
| 4,069,064 | 1/1978 | Nett et al. | 260/314.5 X |
| 4,088,507 | 5/1978 | Tanaka et al. | 106/288 Q |

FOREIGN PATENT DOCUMENTS

| | | | |
|---|---|---|---|
| 647849 | 8/1964 | Belgium | 106/308 S |
| 2238401 | 2/1974 | Fed. Rep. of Germany | 106/308 S |

OTHER PUBLICATIONS

Moser, F. H. et al.-Phthalocyanine Compounds-Pub. 1963-Reinhold Pub. Co., N.Y.C., pp. 159-160.

*Primary Examiner*—Helen M. McCarthy
*Attorney, Agent, or Firm*—Jordan and Hamburg

[57] ABSTRACT

A phthalocyanine pigment composition comprising (A) 100 parts by weight of phthalocyanine pigment, (B) a specific phthalocyanine derivative and (C) a polyvalent metal salt of an anionic surface-active agent, the compounds (B) and (C) being contained in a molar ratio of 1:0.1-5 and totalling 0.5-30 parts by weight, the pigment composition being useful as a colorant in the preparation of coating materials and printing inks having excellent non-crystallization and non-flocculation as well as satisfactory fluidity, from which coating materials and printing inks are obtained coatings or films having remarkable gloss and high tinting strength.

8 Claims, No Drawings

PHTHALOCYANINE PIGMENT COMPOSITIONS

This invention relates to a pigment composition for use as a colorant in the preparation of coating materials and printing inks having excellent non-crystallization and non-flocculation as well as satisfactory fluidity, from which coating materials and printing inks are obtained coatings or films having remarkable gloss and high tinting strength.

Phthalocyanine pigments have attractive color tone, various excellent fastnesses and the like and are widely used as colorants, however, they have still problems to be solved depending on the purpose for which they are used.

As is generally known, there are two types of most widely used phthalocyanine pigments, one being yellowish blue pigment ($\beta$ type) obtained by mechanically triturating crude copper phthalocyanine and the other being reddish blue pigment ($\alpha$ type) obtained by dissolving or suspending crude copper phthalocyanine in concentrated sulfuric acid and then pouring the phthalocyanine so dissolved or suspended into water for reprecipitation. These types of pigments are disadvantageous in that they are too fine in particle size thereby rendering it difficult to disperse such fine particles satisfactorily in a vehicle and that coating materials or printing inks containing the pigment exhibit inferior fluidity and cause an increase in viscosity with the lapse of time, and films obtained from coating materials and printing inks tend to raise various problems as to poor gloss, low tinting strength and degradation of gloss with the lapse of time.

In an attempt to eliminate such disadvantages as above, there have heretofore been proposed several processes such as a process comprising incorporating copper phthalocyanine pigment with a large proportion of a metal phthalocyanine other than the copper phthalocyanine as disclosed in Japanese Patent Gazettes Nos. 3534/58 and 12884/63, a process comprising incorporating copper phthalocyanine pigment with sulfonated copper phthalocyanine as disclosed in Japanese Patent Gazettes Nos. 3466/66 and 1711/69, a process comprising incorporating copper phthalocyanine pigment with phthalimide methyl copper phthalocyanine as disclosed in U.S. Pat. No. 2,761,865 and a process comprising incorporating copper phthalocyanine pigment with a copper phthalocyanine derivative prepared by reacting chloromethylated copper phthalocyanine with a primary, secondary or tertiary amine as disclosed in Japanese Patent Gazettes Nos. 2713/63 and 16787/64; among others, the process comprising incorporating copper phthalocyanine pigment with said copper phthalocyanine derivative is generally known. Further, Japanese Patent Application Laying-Open Gazette No. 133323/76 discloses a process comprising incorporating phthalocyanine pigment with a phthalocyanine derivative treated with an aliphatic sulfonic acid, benzolsulfonic acid, naphthalenesulfonic acid or the like. The products obtained by this process are still unsatisfactory in gloss, tinting strength, fluidity and the like; further, they have inferior water resistance, solvent resistance and like properties because of the use of a large amount of the aliphatic sulfonic acid or the like in the process and they are expensive.

The present inventors, as the result of their intensive studies, succeeded in eliminating the aforesaid drawbacks by incorporating phthalocyanine pigment with a phthalocyanine derivative and a polyvalent metal salt of an anionic surface-active agent.

A primary object of this invention is to provide phthalocyanine pigment compositions exhibiting excellent non-crystallization, non-flocculation, gloss, tinting strength and fluidity.

The phthalocyanine pigment composition of this invention comprises (A) 100 parts by weight of phthalocyanine pigment, (B) a phthalocyanine derivative selected from the group consisting of compounds (I) and (II) represented by the following general formulae, respectively,

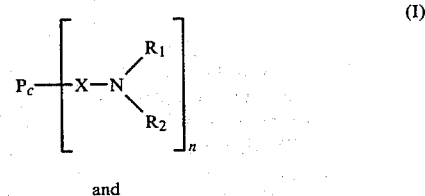

and

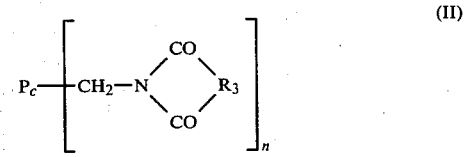

wherein $P_c$ is the n-valent residue of a metal-free or metal phthalocyanine and may, if desired, contain at least one of a chlorine atom, bromine atom and sulfonic group, X is $-(CH_2)_m-$, $-CH_2NH(CH_2)_l-$, $-CH_2NHCO(CH_2)_l-$ or $-SO_2NH(CH_2)_l-$, $R_1$ is a hydrogen atom, alkyl group or hydroxyalkyl group, $R_2$ is an alkyl group, cycloalkyl group, hydroxyalkyl group, aminoalkyl group or aralkyl group or it forms a heterocyclic ring together with $R_1$, $R_3$ is a substituted or unsubstituted ortho-phenylene group, and l, m and n are an integer of 1–4, 1–2 and 1–8 respectively, and (C) is a polyvalent metal salt of an anionic surface-active agent, said compounds (B) and (C) being contained in a molar ratio of 1:0.1–5 and totalling 0.5–30 parts by weight.

The phthalocyanine pigments (A) used in this invention generally include any phthalocyanine pigments which are metal-free phthalocyanine pigments, metal phthalocyanine pigments and mixtures thereof. In addition, the phthalocyanine pigments may be in the $\alpha$-, $\beta$-, $\gamma$-, $\delta$-, $\epsilon$- or the like crystal form or may contain at least one bromine and/or chlorine atom in the molecule.

The phthalocyanine derivative (B) is at least one member selected from the group consisting of compounds represented respectively by the aforesaid general formulae (I) and (II) wherein $P_c$ is the n-valent residue of a metal-free or metal phthalocyanine and may, if desired, contain at least one of a chlorine atom, bromine atom and sulfonic group.

The group X in the formula (I) is $-CH_2-$, $-(CH_2)_2-$, $-CH_2NHCH_2-$, $-CH_2NH(CH_2)_2-$, $-CH_2NH(CH_2)_3-$, $-CH_2NH(CH_2)_4-$, $-CH_2NHCOCH_2-$, $-CH_2NHCO(CH_2)_2-$, $-CH_2NHCO(CH_2)_3-$, $-CH_2NHCO(CH_2)_4-$, $-SO_2NHCH_2-$, $-SO_2NH(CH_2)_2-$, $-SO_2NH(CH_2)_3-$, $-SO_2NH(CH_2)_4-$ or the like. The symbol $R_3$ in the formula (II) represents a substituted or unsubstituted o-phenylene group and, in this case, a nitro group, amino group, carboxyl group, halogen atom and the like may be substituted as substituents on the phenylene nucleus.

The anionic surface-active agents used herein include alkali metal or ammonium salts of fatty acids, esters of higher alcohols and sulfuric acid, alkylbenzenesulfonates, alkylnaphthalenesulfonates, dialkylsulfosuccinates, naphthalene-sulfonic acid-form aldehyde condensates, alkylphosphates, polyoxyethylene sulfates and mixtures thereof, among which higher alcohol-sulfuric acid esters, dialkylsulfosuccinates, alkylbenzenesulfonates and alkylnaphthalenesulfonates are particularly preferred.

The metal of the polyvalent metal salt of an anionic surface-active agent includes barium, calcium, zinc, strontium or manganese.

The phthalocyanine pigment compositions of this invention may be prepared by any methods as far as they are capable of intimately mixing together phthalocyanine pigment (A), the phthalocyanine derivative (B) and the polyvalent metal salt of an anionic surface-active agent (C). For example, an aqueous slurry of the phthalocyanine derivative (B) prepared by a usual method (U.S. Pat. No. 2,761,868, Japanese Patent Gazettes No. 2713/63 and 16787/64 and U.S. Pat. No. 4,088,507) is incorporated with a predetermined amount of an anionic surface-active agent to form a uniform mixture, the mixture so formed is incorporated with an inorganic polyvalent metal salt such as calcium, barium, zinc, strontium or manganese chloride to produce a polyvalent metal salt of the anionic surface-active agent and, if desired, the polyvalent metal salt so produced is filtered off, washed with water, dried and then pulverized to obtain a blend of the derivative (B) and the metal salt (C). The molar ratio of the derivative (B) to the metal salt (C) is in the range of 1:0.1–5, preferably 1:0.1–0.8. The blend so obtained is then intimately mixed with phthalocyanine pigment. The mixing may be effected in any states such as in the slurried, pasty or powdery state, and the blend ((B)+(C)) may be added to phthalocyanine pigment (A) in an amount of 0.5–30 parts, preferably 2–20 parts, by weight per 100 parts by weight of phthalocyanine pigment (A).

The phthalocyanine pigment compositions of this invention will not exhibit crystal growth, crystal transformation and flocculation in a non-aqueous medium. They may be dispersed satisfactorily in coating materials such as nitrocellulose lacquer, a baking aminoalkyd resin coating material, an air drying alkyd resin coating material and an acrylic resin coating material, as well as in vehicles such as polyamide, nitrocellulose, cyclized rubber and chlorinated rubber for packaging and publication gravure inks or the like. Further, the pigment compositions of this invention exhibit more excellent stability than conventionally stabilized phthalocyanine pigments. Coating materials or printing inks containing the pigment composition of this invention exhibit satisfactory fluidity without causing an increase in viscosity with the lapse of time, and coatings or films obtained therefrom exhibit remarkable gloss, high tinting strength, and excellent water resistance and solvent resistance without causing degradation of gloss and tinting strength with the lapse of time.

This invention will be better understood by the following Examples wherein all the parts are by weight unless otherwise specified.

EXAMPLE 1

(a) Twenty-one (21) parts, calculated as dry matter, of bis-(piperidinoacetamidemethyl)-copper phthalocyanine in paste form were introduced into a beaker, incorporated with water and agitated to form about 700 parts of a slurry. The slurry so formed was incorporated with 3.0 parts of sodium lauryl sulfate, agitated for about 30 minutes, incorporated with 3.8 parts of barium chloride, agitated for another 30 minutes, filtered out and washed with water and dried to obtain a dried blend ((B)+(C)) of the phthalocyanine derivative and a metal salt of the lauryl sodium sulfate. Two parts of the thus obtained blend in powder form were mixed with 100 parts of $\beta$-type copper phthalocyanine pigment obtained by mechanical trituration to obtain a uniform mixture. Eighteen (18) parts of the mixture so obtained were dispersed in 82 parts of nitrocellulose type varnish for gravure printing inks by the use of a 1-liter ball mill to obtain an ink 1(a). The ink as obtained had a very satisfactory viscosity as indicated in Table 1 and it exhibited remarkable gloss as indicated in Table 1 when it was applied to a triacetate film after having been treated so that it had a viscosity expressed in terms of Zahn Cup No. 2, 50 seconds (20° C.).

In addition, the aforesaid mixture exhibited satisfactory properties as pigment when used in paints such as nitrocellulose lacquer, a baking aminoalkyd resin paint, an air drying alkyd resin paint and an acrylic resin paint and even when used in extenders such as polyamide, nitrocellulose, cyclized rubber and chlorinated rubber for packaging and publication gravure inks or the like.

(b) Comparative test (b-1): For comparison, the procedure of (a) was followed except that barium chloride was not added, to obtain an ink 1(b-1). The ink so obtained was inferior in viscosity and gloss to the ink 1(a) as indicated in Table 1.

(b-2): For further comparison, the procedure of (a) was followed except that bis-(piperidinoacetamidemethyl)-copper phthalocyanine in paste form was dried only, to obtain a product in powder form. The powdery product so obtained was added to $\beta$-type copper phthalocyanine in the same manner as (a) and then treated in the same manner as (a) to obtain an ink 1(b-2). The ink so obtained was inferior in viscosity and gloss to the ink 1(a) as shown in Table 1.

Table 1

| Example and Comparative examples | Viscosity of ink as obtained (Zahn Cup, 20° C.) | Gloss (60°-angle glossmeter) |
| --- | --- | --- |
| 1 (a) | 82 sec. | 70.1% |
| 1 (b-1) | At least 250 sec. | 56.9% |
| 1 (b-2) | At least 250 sec. | 54.5% |

Remarks: The glossmeter is one produced by Toyo Rikagaku Co., Ltd.

EXAMPLE 2

(a) Five parts of the same blend ((B)+(C)) of phthalocyanine derivative and metal salt of lauryl sodium sulfate as obtained in Example 1 (a) were mixed with 100 parts of a crystal transformative, flocculating $\alpha$-type copper phthalocyanine pigment in powder form to form a uniform mixture. Five parts of the mixture so formed and 100 parts of xylene were introduced into a 2000-ml Erlenmeyer flask and boiled under reflux for 5 hours. After cooled, the whole was filtered to separate the pigment from the xylene. The pigment so separated was dried and then tested for its crystal form by an X-ray diffraction method with the result that transition to β-type crystal was not appreciated. The pigment after so boiled, as compared with the same before boiled with xylene, exhibited no changes in shape and size of crystal when viewed by an electromicroscopic photograph thereof. Further, inks prepared by kneading the pigment (after boiled) with linseed oil had the same color shade and tinting strength as those prepared by kneading the pigment (before boiled) with the same oil.

Sixteen and a half (16.5) parts of the aforesaid mixture of the blend ((B)+(C)) and the α-type copper phthalocyanine (A) were dispersed in 283.5 parts of an alkyd melamine resin varnish by the use of a 1-liter ball mill to produce a paint 2 (a). The paint just produced was tested for viscosity at 25° C. by a BM type viscosimeter. The result is shown in Table 2 without showing structural viscosity.

Table 2

| BM type viscosimeter | | | | |
|---|---|---|---|---|
| Rotation (rpm) | 6 | 12 | 30 | 60 |
| Viscosity (cps) | 900 | 890 | 890 | 880 |

The said paint, after the lapse of one week, was again tested for viscosity by the same BM type viscosimeter with the result being shown in Table 3, from which the viscosity was hardly increased.

Table 3

| Number of rotation (rpm) | 6 | 12 | 30 | 60 |
|---|---|---|---|---|
| Viscosity (cps) | 1000 | 950 | 930 | 900 |

Further, the aforesaid paint was adjusted to have a viscosity expressed in terms of Ford Cup No. 4, 20-22 seconds (25° C.), sprayed on a tin plate, set for about 15 minutes and baked at 130° C. for 30 minutes to obtain a coating. The coating so obtained had very satisfactory gloss as indicated in Table 4.

In addition, 22 parts of a white paint (A) were prepared from 5.5 parts of titanium dioxide and 16.5 parts of the alkyd-melamine resin varnish, while 10 parts of a paint (B) were prepared from 0.55 parts of a mixture of the copper phthalocyanine derivative, the polyvalent metal salt of lauryl sodium sulfate and α-type copper phthalocyanine and 9.45 parts of the alkyd-melamine resin varnish. Then, 22 parts of the white paint (A) were kneaded with 10 parts of the paint (B) to form a tinted paint (C) of 1/10 cut ("1/10 cut" means that the ratio between the amount of the pigment mixture used and that of the titanium dioxide used is 0.55 parts/5.5 parts=1/10) which was mixed with xylene in such an amount that the resulting diluted paint (D) had a viscosity expressed in terms of Ford Cup No. 4, 20"-22" (25° C.).

Separately, 6.19 parts of titanium dioxide, 0.17 parts of carbon black, 0.69 parts of rouge and 18.94 parts of the alkyd-melamine resin varnish were blended together to form 26 parts of a mixed tinted paint (E), while 0.75 parts of the mixture of the copper phthalocyanine derivative, the polyvalent metal salt of lauryl sodium sulfate and α-type copper phthalocyanine were blended with 9.25 parts of the alkyd-melamine resin varnish to form 10 parts of a paint (B'). Then, the paints (E) and (B') were blended together to form a paint (F) which was then mixed with xylene in such an amount that the resulting diluted paint (G) had a viscosity in terms of Ford Cup No. 4, 20"-22" (25° C.). The two paints (D) and (G) so prepared were placed in test tubes to observe how they caused flocculation, respectively, but they did not cause flocculation and precipitation of the pigment even one month later.

In addition, the aforesaid pigment mixtures exhibited satisfactory properties as pigment when used in paints such as nitrocellulose lacquer, an air drying alkyd resin paint and an acrylic resin paint and even when used in extenders such as polyamide, nitrocellulose, cyclized rubber and chlorinated rubber for packaging gravure inks, publication gravure inks or the like.

(b) Comparative test

The procedure of Example 2 (a) was followed except that barium chloride was not added, to obtain a paint 2 (b). The paint 2 (b) did not exhibit structural viscosity, a change in viscosity and tinting strength with the lapse of time, flooding, precipitation etc. like the paint 2 (a), however, it was inferior in gloss as indicated in Table 4.

Table 4

| | Gloss (60°-angle Glossmeter) |
|---|---|
| Example 2 (a) | 90.5% |
| Comparative example 2 (b) | 79.4% |

Remarks
Glossmeter produced by Toyo Rikagaku Co., Ltd.

EXAMPLE 3

α-type copper phthalocyanine pigment obtained by dissolving a crude phthalocyanine in concentrated sulfuric acid and pouring the resulting solution in water to re-precipitate was filtered off and washed with water to obtain a pressed cake. The press cake was weighed out in an amount of 100 parts, calculated as dry pigment, was re-slurried in 1200 parts of water. Separately, the same slurry of the copper phthalocyanine derivative and the metal salt as obtained in Example 1 (a) was incorporated with the thus obtained paste in an amount of 25 parts, calculated as dry matter, agitated for one hour to obtain a uniform mixture which was filtered, dried and then pulverized to obtain a pigment composition of this invention. Like the pigment composition obtained in Example 2 (a), the pigment composition so obtained was non-crystallizing, non-flocculating in various coating materials and gravure printing inks and it exhibited satisfactory properties as pigment.

EXAMPLES 4-25

The procedure of Example 1 (a) was followed except that the various phthalocyanine derivatives (B) and the various polyvalent metal salts (C) of anionic surface-active agent indicated in Table 5 were used as shown in the same Table thereby to produce various inks. Both the viscosity of each of the inks just produced and the gloss displayed when each of the inks was printed on a triacetate film after having been treated so that it had a viscosity expressed in terms of Zahn Cup No. 2, 50 seconds (20° C.), were tested in the same manner as in Example 1 (a) with the result that they were found to be very satisfactory as shown in Table 5.

Table 5

| Ex. | Phthalocyanine derivative (B) Structural formula | Parts | Polyvalent metal salt of anionic surface-active agent (C) Structural formula | Parts | Viscosity (sec) | Gloss (%) |
|---|---|---|---|---|---|---|
| 4 | $CuPc \text{-} (CH_2 \text{-} N\bigcirc)_{2.1}$ | 21.0 | $(C_{12}H_{25}OSO_3)_2Ba$ | 1.9 | 90 | 66.8 |
| 5 | $CuPc \text{-} (CH_2 \text{-} N\bigcirc)_{2.1}$ | 21.0 | $\left(\begin{array}{l}C_8H_{17}OOC \cdot CH \cdot SO_3 \\ C_8H_{17}OOC \cdot CH_2\end{array}\right)_2 Ba$ | 80.0 | 87 | 68.6 |
| 6 | $CuPc \text{-} (CH_2 \text{-} N(C_2H_5)_2)_{3.0}$ | 21.0 | $(C_{12}H_{25}\text{-}C_6H_4\text{-}SO_3)_2Ca$ | 8.7 | 81 | 70.5 |
| 7 | $CuPc \text{-} (CH_2 \text{-} N(C_2H_5)_2)_{3.0}$ | 21.0 | $(C_{12}H_{25}\text{-}C_{10}H_6\text{-}SO_3)_2Ca$ | 79.7 | 81 | 70.4 |
| 8 | $CuPc \text{-} (CH_2NHCH_2CH_2CH_2N(C_2H_5)_2)_{2.2}$ | 21.0 | $(C_{12}H_{25}OSO_3)_2Zn$ | 14.0 | 82 | 71.1 |
| 9 | $CuPc \text{-} (CH_2NHCH_2CH_2CH_2N(C_2H_5)_2)_{2.2}$ | 21.0 | $\left(\begin{array}{l}C_8H_{17}OOC \cdot CH \cdot SO_3 \\ C_8H_{17}OOC \cdot CH_2\end{array}\right)_2 Zn$ | 123.2 | 78 | 74.3 |
| 10 | $CuPc \text{-} (CH_2NHCOCH_2N\bigcirc)_{1.0}$ | 21.0 | $(C_{12}H_{25}\text{-}C_6H_4\text{-}SO_3)_2Mn$ | 40.8 | 80 | 70.1 |
| 11 | $CuPc \text{-} (CH_2NHCOCH_2N\bigcirc)_{1.0}$ | 21.0 | $(C_{12}H_{25}\text{-}C_{10}H_6\text{-}SO_3)_2Mn$ | 18.7 | 92 | 66.1 |
| 12 | $CuPc \text{-} (CH_2NHCOCH_2N(C_2H_5)_2)_{2.0}$ | 21.0 | $(C_{12}H_{25}OSO_3)_2Ba$ | 40.7 | 91 | 67.2 |
| 13 | $CuPc \text{-} (CH_2NHCOCH_2N(C_2H_5)_2)_{2.0}$ | 21.0 | $\left(\begin{array}{l}C_8H_{17}OOC \cdot CH \cdot SO_3 \\ C_8H_{17}OOC \cdot CH_2\end{array}\right)_2 Ba$ | 2.4 | 101 | 63.7 |
| 14 | $CuPc \text{-} (CH_2NHCOCH_2NHCH_2CH_2N\bigcirc)_{1.1}$ | 21.0 | $(C_{12}H_{25}\text{-}C_6H_4\text{-}SO_3)_2Ca$ | 54.2 | 80 | 70.6 |
| 15 | $CuPc \text{-} (CH_2NHCOCH_2NHCH_2CH_2N\bigcirc)_{1.1}$ | 21.0 | $(C_{12}H_{25}\text{-}C_{10}H_6\text{-}SO_3)_2Ca$ | 10.4 | 80 | 70.7 |
| 16 | $CuPc \text{-} (SO_2NHCH_2CH_2CH_2N(C_2H_5)_2)_{2.0}$ | 21.0 | $(C_{12}H_{25}OSO_3)_2Zn$ | 51.6 | 75 | 74.1 |
| 17 | $CuPc \text{-} (SO_2NHCH_2CH_2CH_2N(C_2H_5)_2)_{2.0}$ | 21.0 | $\left(\begin{array}{l}C_8H_{17}OOC \cdot CH \cdot SO_3 \\ C_8H_{17}OOC \cdot CH_2\end{array}\right)_2 Zn$ | 22.6 | 87 | 68.6 |
| 18 | $CuPc \text{-} (SO_2NHCH_2CH_2N\bigcirc)_{2.5}$ | 21.0 | $(C_{12}H_{25}\text{-}C_6H_4\text{-}SO_3)_2Mn$ | 4.3 | 80 | 70.5 |

Table 5-continued

| Ex. | Phthalocyanine derivative (B) Structural formula | Parts | Polyvalent metal salt of anionic surface-active agent (C) Structural formula | Parts | Viscosity (sec) | Gloss (%) |
|---|---|---|---|---|---|---|
| 19 | CuPc$-$(SO$_2$NHCH$_2$CH$_2$N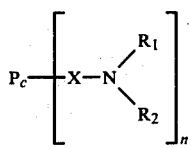)$_{2.5}$ | 21.0 | (C$_{12}$H$_{25}$—⬡⬡—SO$_3$)$_2$Mn | 32.2 | 73 | 75.3 |
| 20 | CuPc$-$(CH$_2$—N(CO)$_2$⬡)$_{3.0}$ | 21.0 | (C$_{12}$H$_{25}$OSO$_3$)$_2$Ba | 10.6 | 85 | 68.1 |
| 21 | CuPc$-$(CH$_2$—N(CO)$_2$⬡)$_{3.0}$ | 21.0 | $\begin{pmatrix} C_8H_{17}OOC \cdot CH \cdot SO_3 \\ C_8H_{17}OOC \cdot CH_2 \end{pmatrix}_2$Ba | 48.7 | 80 | 70.0 |
| 22 | CuPc$-$(CH$_2$—N(CO)$_2$⬡-NO$_2$)$_{1.5}$ | 21.0 | (C$_{12}$H$_{25}$—⬡—SO$_3$)$_2$Ca | 1.5 | 83 | 71.5 |
| 23 | CuPc$-$(CH$_2$—N(CO)$_2$⬡-NO$_2$)$_{1.5}$ | 21.0 | (C$_{12}$H$_{25}$—⬡⬡—SO$_3$)$_2$Ca | 51.0 | 90 | 65.4 |
| 24 | Pc$-$(CH$_2$—N(C$_2$H$_5$)$_2$)$_{2.8}$ | 21.0 | (C$_{12}$H$_{25}$—⬡—SO$_3$)$_2$Ca | 9.4 | 80 | 69.5 |
| 25 | Pc$-$(CH$_2$—N(C$_2$H$_5$)$_2$)$_{2.8}$ | 21.0 | (C$_{12}$H$_{25}$—⬡⬡—SO$_3$)$_2$Ca | 86.8 | 80 | 70.7 |

In the Table, CuPc - is the residue of copper phthalocyanine, and Pc - is the residue of phthalocyanine.

What is claimed is:

1. A phthalocyanine pigment composition comprising (A) 100 parts by weight of phthalocyanine pigment, (B) a phthalocyanine derivative selected from the group consisting of compounds (I) and (II) represented by the following general formulae, respectively, $$P_c\left[X-N\begin{matrix}R_1\\R_2\end{matrix}\right]_n \quad (I)$$

and $$P_c\left[CH_2-N\begin{matrix}CO\\CO\end{matrix}R_3\right]_n \quad (II)$$

wherein $P_c$ is the n-valent residue of a metal-free or metal phthalocyanine, X is —(CH$_2$)$_m$—, —CH$_2$NH(CH$_2$)$_l$—, —CH$_2$NHCO(CH$_2$)$_l$— or —SO$_2$NH(CH$_2$)$_l$—, R$_1$ is a hydrogen atom, alkyl group or hydroxyalkyl group, R$_2$ is an alkyl group, cycloalkyl group, hydroxyalkyl group, aminoalkyl group or aralkyl group, R$_1$ and R$_2$ may be combined together in this case, $$-N\begin{matrix}R_1\\R_2\end{matrix}$$

may be substituted by a saturated five-, six- or seven-membered heterocyclic ring having oxygen, nitrogen and/or sulfur atoms as other members of the ring, R$_3$ is a substituted or unsubstituted ortho-phenylene group, and l, m and n are an integer of 1-4, 1-2 and 1-8 respectively, and (C) a polyvalent metal salt of an anionic surface-active agent wherein the polyvalent metal is barium, calcium, zinc, strontium or manganese, the compounds (B) and (C) being comprised in a molar ratio of 1:0.1-5 and totalling 0.5-30 parts by weight, said composition being formed by mixing said phthalocyanine derivative with said polyvalent metal salt of an anionic surface-active agent and thereafter mixing the resulting blend with said phthalocyanine pigment.

2. A phthalocyanine pigment composition according to claim 1, wherein the P$_c$ in the formulae (I) and (II) contains at least one of a chlorine atom, bromine atom and sulfonic group.

3. A phthalocyanine pigment composition according to claim 1, wherein the phthalocyanine derivative (B) and the polyvalent metal salt (C) of an anionic surface-active agent are present in a molar ratio of 1:0.1-0.8.

4. A phthalocyanine pigment composition according to claim 1, 2 or 3, wherein the anionic surface-active agent is an ester of a higher alcohol and sulfuric acid.

5. A phthalocyanine pigment composition according to claim 1, 2 or 3, wherein the anionic surface-active agent is a dialkylsulfosuccinate.

6. A phthalocyanine pigment composition according to claim 1, 2 or 3, wherein the anionic surface-active agent is an alkylbenzenesulfonate.

7. A phthalocyanine pigment composition according to claim 1, 2 or 3, wherein the anionic surface-active agent is an alkylnaphthalenesulfonate.

8. A phthalocyanine pigment composition comprising (A) 100 parts by weight of phthalocyanine pigment, (B) a phthalocyanine derivative selected from the group consisting of compounds (I) and (II) represented by the following general formulae, respectively,

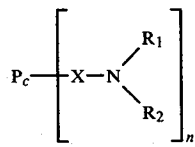
(I)

and

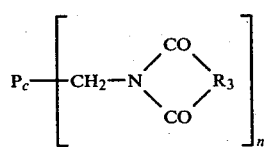
(II)

wherein $P_c$ is the n-valent residue of a metal-free or metal phthalocyanine, X is $-(CH_2)_m-$, $-CH_2NH(CH_2)_l-$, $-CH_2NHCO(CH_2)_l-$ or $-SO_2NH(CH_2)_l-$, $R_1$ is a hydrogen atom, alkyl group or hydroxyalkyl group, $R_2$ is an alkyl group, cycloalkyl group, hydroxyalkyl group, aminoalkyl group or aralkyl group, $R_1$ and $R_2$ may be combined together in this case,

may be substituted by a saturated five-, six- or seven-membered heterocyclic ring having oxygen, nitrogen and/or sulfur atoms as other members of the ring, $R_3$ is a substituted or unsubstituted ortho-phenylene group, and l, m and n are an integer of 1-4, 1-2, and 1-8 respectively, and (C) a polyvalent metal salt of an anionic surface-active agent wherein the polyvalent metal is barium, calcium, zinc, strontium or manganese, the compounds (B) and (C) being comprised in a molar ratio of 1:0.1-5 and totalling 0.5-30 parts by weight, said composition being formed by mixing said phthalocyanine derivative with said anionic surface-active agent in an aqueous slurry, adding an inorganic polyvalent metal salt thereto with agitation, and thereafter mixing the resulting blend with said phthalocyanine pigment.

* * * * *